(12) United States Patent
Sainath et al.

(10) Patent No.: US 10,515,307 B2
(45) Date of Patent: Dec. 24, 2019

(54) COMPRESSED RECURRENT NEURAL NETWORK MODELS

(71) Applicant: Google LLC, Mountain View, CA (US)

(72) Inventors: Tara N. Sainath, Jersey City, NJ (US); Vikas Sindhwani, Hawthorne, NY (US)

(73) Assignee: Google LLC, Mountain View, CA (US)

( * ) Notice: Subject to any disclaimer, the term of this patent is extended or adjusted under 35 U.S.C. 154(b) by 588 days.

(21) Appl. No.: 15/172,457

(22) Filed: Jun. 3, 2016

(65) Prior Publication Data

US 2017/0076196 A1    Mar. 16, 2017

Related U.S. Application Data

(60) Provisional application No. 62/301,734, filed on Mar. 1, 2016, provisional application No. 62/172,018, filed on Jun. 5, 2015.

(51) Int. Cl.
*G06F 15/18* (2006.01)
*G06N 3/08* (2006.01)
*G06N 3/04* (2006.01)

(52) U.S. Cl.
CPC ........... *G06N 3/084* (2013.01); *G06N 3/0445* (2013.01)

(58) Field of Classification Search
CPC ................................. G06N 3/02; G06F 17/16
USPC ...................................................... 706/15, 45
See application file for complete search history.

(56) References Cited

U.S. PATENT DOCUMENTS

| 2015/0161991 A1* | 6/2015 | Sak ......................... G10L 15/02 |
| | | 704/254 |
| 2015/0170020 A1 | 6/2015 | Garimella |
| 2016/0035344 A1 | 2/2016 | Gonzalex-Dominguez et al. |
| 2016/0299685 A1* | 10/2016 | Zhai ...................... G06F 3/0219 |

OTHER PUBLICATIONS

Graves. "Generating Sequences with Recurrent Neural Networks," arXiv preprint arXiv1308.0850, Jun. 5, 2014, 43 pages.
International Search Report and Written Opinion in International Application No. PCT/US2016/065417, dated Mar. 17, 2017, 16 pages.

(Continued)

*Primary Examiner* — David R Vincent
(74) *Attorney, Agent, or Firm* — Fish & Richardson P.C.

(57) ABSTRACT

Methods, systems, and apparatus, including computer programs encoded on computer storage media, for implementing long-short term memory layers with compressed gating functions. One of the systems includes a first long short-term memory (LSTM) layer, wherein the first LSTM layer is configured to, for each of the plurality of time steps, generate a new layer state and a new layer output by applying a plurality of gates to a current layer input, a current layer state, and a current layer output, each of the plurality of gates being configured to, for each of the plurality of time steps, generate a respective intermediate gate output vector by multiplying a gate input vector and a gate parameter matrix. The gate parameter matrix for at least one of the plurality of gates is a structured matrix or is defined by a compressed parameter matrix and a projection matrix.

20 Claims, 6 Drawing Sheets

(56) References Cited

OTHER PUBLICATIONS

Lemmerling et al. "Fast algorithm for solving the Hangel/Toeplitz structured total least squares problem," Numerical Algothims, Baltzer, Amsterdam, NL 23(4) Jan. 1, 2000, 22 pages.
Zhiyun et al. "Learning compact recurrent neural networks," 2016 IEEE International Conference on Acoustics, Speech and Signal Processing, Mar. 20, 2016, 5 pages.
Gu et al. "Recent Advances in Convolutional Neural Networks," arXiv preprint arXiv Jan. 5, 2017, 37 pages.
Hopcroft et al. "Foundations of Data Science," Jan. 25, 2016, pp. 1-2, 22-23, 35-30 http://www.cs/cornell.edu/jeh/bookJan25_2016.pdf, 30 pages.
'www.deeplearning4j.org' [online] Deep Learning for Java (DL4J): A Beginner's Guide to Recurrent Networks and LSTMs, Jan. 21, 2016, [retrieved on May 28, 2017] Retrieved from Internet: URL<https://deeplearning4j.org/lstm.html, archived in < http://web.archive.org/web/20160121030921/https://deeplearning4j.org/lstm.html > 12 pages.
Office Action issued in German Application No. 102016125838.5, dated May 1, 2017, 16 pages.
Written Opinion issued in International Application No. PCT/US2016065417, dated Jan. 31, 2018, 8 pages.
International Preliminary Report on Patentability issued in International Application No. PCT/US2016/065417, dated May 31, 2018, 23 pages.
Chen et al., "Compressing neural networks with the hashing trick," arXiv preprint arXiv:1504.04788, Apr. 2015, 10 pages.
Chen et al., "Small-footprint keyword spotting using deep neural networks," 2014 IEEE International Conference on Acoustics, Speech and Signal Processing (ICASSP), May 2014, pp. 4087-4091.
Cheng et al., "Fast neural networks with circulant projections," arXiv preprint arXiv:1502.03436, Oct. 2015, 9 pages.
Ciresan et al., "High-performance neural networks for visual object classification," arXiv preprint arXiv:1102.0183, Feb. 2011, 12 pages.
Collins and Kohli, "Memory bounded deep convolutional neural networks," arXiv preprint arXiv:1412.1442, Dec. 2014, 10 pages.
Courbariaux et al., "Low precision storage for deep learning," arXiv preprint arXiv:1412.7024, Feb. 2015, 9 pages.
Dean et al., "Large-scale distributed deep networks," In Advances in Neural Information Processing Systems, pp. 1223-1231, 2012.
Denil et al., "Predicting parameters in deep learning," In NIPS, Jun. 2013, 9 pages.
Gers and Schmidhuber, "Recurrent nets that time and count," Neural Networks, 2000, Proceedings of the IEEE-INNS-ENNS International Joint Conference on IEEE, vol. 3, pp. 189-194, Jul. 2000.
Gers et al., "Learning to forget: Continual prediction with LSTM," Neural Computation, 12(10):2451-2471, Oct. 2000.
Gray, "Toeplitz and circulant matrices: A review," Foundations and Trends in Communications and Information Theory, 2(3):155-239, Jan. 2006.
Greff et al., "LSTM: A search space odyssey," arXiv preprint arXiv:1503.04069, Mar. 2015, 18 pages.
Hinton et al., "Distilling the knowledge in a neural network," arXiv preprint arXiv:1503.02531, Mar. 2015, 9 pages.
Hochreiter and Schmidhuber, "Long short-term memory," Neural computation, 9(8):1735-1780, 1997.
Kailath and Chun, "Generalized displacement structure for block Toeplitz, Toeplitz block and Toeplitz-derived matrices," SIAM J. Matrix Anal. Appl., 15(1):114-128, 1994.
Kailath et al., "Displacement ranks of matrices and linear equations," Journal of Mathematical Analysis and Applications, 68(2):395-407, Apr. 1979.
Larochelle et al., "An empirical evaluation of deep architectures on problems with many factors of variation," Proceedings of the 24th international conference on Machine learning, pp. 473-780, 2007.
Le et al., "Fastfood—approximating kernel expansions in loglinear time," Proceedings of the $30^{th}$ International Conference on Machine Learning, 2013, 9 pages.
Liberty and Zucker, "The mailman algorithm: a note on matrix vector multiplication," Information Processing Letters, 109(3):179-182, Jan. 2009.
Pan, "Structured Matrices and Polynomials: Unified Superfast Algorithms," Springer, 2001, Part 1, 116 pages.
Pan, "Structured Matrices and Polynomials: Unified Superfast Algorithms," Springer, 2001, Part 2, 106 pages.
Pan, "Structured Matrices and Polynomials: Unified Superfast Algorithms," Springer, 2001, Part 3, 77 pages.
Rahimi and Recht, "Random features for large-scale kernel machines," Advances in neural information processing systems, 2007, pp. 1177-1184.
Rakhuba and Oseledets, "Fast multidimensional convolution in low-rank tensor formats via cross approximation," SIAM J. Sci. Comput., 37(2):A565-A582, 2015.
Sainath and Parada, "Convolutional neural networks for small-footprint keyword spotting," Proc. INTERSPEECH, 2015, 5 pages.
Sainath et al., "Convolutional, Long Short-Term Memory, Fully Connected Deep Neural Networks," IEEE International Conference on Acoustics, Speech and Signal Processing, pp. 4580-4584, Apr. 2015.
Sainath et al., "Low-rank matrix factorization for deep neural network training with high-dimensional output targets," 2013 IEEE International Conference on Acoustics, Speech and Signal Processing, pp. 6655-6659, May 2013.
Sak et al., "Long Short-Term memory recurrent neural network architectures for large scale acoustic modeling," Proc. INTERSPEECH, Feb. 2014, 5 pages.
Saon et al., "Unfolded recurrent neural networks for speech recognition," in INTERSPEECH, 2014, pp. 343-347.
Sindhwani et al., "Structured transforms for small-footprint deep learning," in Proc. NIPS, Oct. 2015, 9 pages.
Vanhoucke et al., "Improving the speed of neural networks on CPUs," In NIPS Workshop on Deep Learning and Unsupervised Feature Learning, 2011, 8 pages.
Xue et al., "Restructuring of deep neural network acoustic models with singular value decomposition," INTERSPEECH, 2013, pp. 2365-2369.
Yang et al., "Deep fried convnets," in arXiv:1412.7149, Jul. 2015, 9 pages.

* cited by examiner

Toeplitz: $T(t)_{ij} = t_{i-j}$ $$200 \quad \begin{bmatrix} t_0 & t_{-1} & \cdots & t_{1-n} \\ t_1 & t_0 & \cdots & \vdots \\ \vdots & \vdots & \vdots & t_{-1} \\ t_{n-1} & \vdots & t_1 & t_0 \end{bmatrix}$$

Vandermonde: $V(v)_{ij} = v_i^j$ $$202 \quad \begin{bmatrix} 1 & v_0 & \cdots & v_0^{n-1} \\ 1 & v_1 & \cdots & v_1^{n-1} \\ \vdots & \vdots & \vdots & \vdots \\ 1 & v_{n-1} & \cdots & v_{n-1}^{n-1} \end{bmatrix}$$

Cauchy: $C(u,v)_{ij} = (u_i - v_j)^{-1}$ $$204 \quad \begin{bmatrix} \dfrac{1}{(u_0 - v_0)} & \cdots & \cdots & \dfrac{1}{(u_0 - v_{n-1})} \\ \dfrac{1}{(u_1 - v_0)} & \cdots & \cdots & \vdots \\ \vdots & \vdots & \vdots & \vdots \\ \dfrac{1}{(u_{n-1} - v_0)} & \cdots & \cdots & \dfrac{1}{(u_{n-1} - v_{n-1})} \end{bmatrix}$$

FIG. 2A $$\sum_{i=1}^{r} \underbrace{\begin{bmatrix} g_0^i & g_{n-1}^i & \cdots & g_1^i \\ g_1^i & g_0^i & \cdots & \vdots \\ \vdots & \cdots & \cdots & g_1^i \\ g_{n-1}^i & \cdots & g_1^i & g_0^i \end{bmatrix}}_{circulant\ (g^i)} \underbrace{\begin{bmatrix} h_0^i & -h_{n-1}^i & \cdots & -h_1^i \\ h_1^i & h_0^i & \cdots & \vdots \\ \vdots & \cdots & \cdots & -h_{n-1}^i \\ h_{n-1}^i & \cdots & h_1^i & h_0^i \end{bmatrix}}_{Skew-circulant\ (h_i)}$$

FIG. 2B

COMPRESSED RECURRENT NEURAL NETWORK MODELS

CROSS-REFERENCE TO RELATED APPLICATION

This application claims the benefit of the filing date of U.S. Provisional Application No. 62/172,018, filed on Jun. 5, 2015, and U.S. Provisional Application No. 62/301,734, filed on Mar. 1, 2016. The contents of U.S. Application Nos. 62/172,018 and 62/301,734 are incorporated herein by reference in their entirety.

BACKGROUND

This specification relates to neural network architectures and compressing neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Some neural networks, e.g., those that are designed for time series problems or sequence-to-sequence learning (recurrent neural networks (RNN)), incorporate recurrent loops which permit memory, in the form of a hidden state variable, to persist within a layer between data inputs. A variation of RNNs, long short-term memory (LSTM) neural networks include multiple gates within each layer to control the persistence of data between data inputs. Some neural networks, e.g., those that are designed for time series problems or sequence-to-sequence learning, incorporate recurrent loops which permit memory, in the form of a hidden state variable, to persist within a layer between data inputs.

SUMMARY

This specification describes technologies that relate to recurrent neural network architectures. In general, a recurrent neural network includes at least one Long Short-Term Memory (LSTM) layer that is compressed. The LSTM layer has at least one gate that has a compressed parameter matrix. The LSTM layer may be compressed by either replacing one or more of the gate parameter matrices in the LSTM layer with a Toeplitz-like structured matrix or by re-defining the gate parameter matrix with a compressed parameter matrix and a projection matrix. Optionally, one LSTM layer may be compressed by replacing one of the gate parameter matrices in the LSTM layer with a Toeplitz-like structured matrix and another LSTM layer may be compressed by replacing one of the gate parameter matrices in the other LSTM layer by re-defining the gate parameter matrix with a compressed parameter matrix and a projection matrix.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The performance of a recurrent neural network can be improved by including a compressed LSTM layer in the recurrent neural network. In particular, by including the compressed LSTM layer in the recurrent neural network, the recurrent neural network is configured to be able to process data more efficiently and use less data storage. A recurrent neural network having a compressed LSTM layer can be effectively trained to achieve word error rates comparable to full size, e.g., uncompressed, recurrent neural networks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A and 2B show example structured matrices.

Like reference numbers and designations in the various drawings indicate like elements.

DETAILED DESCRIPTION

Figure 1:
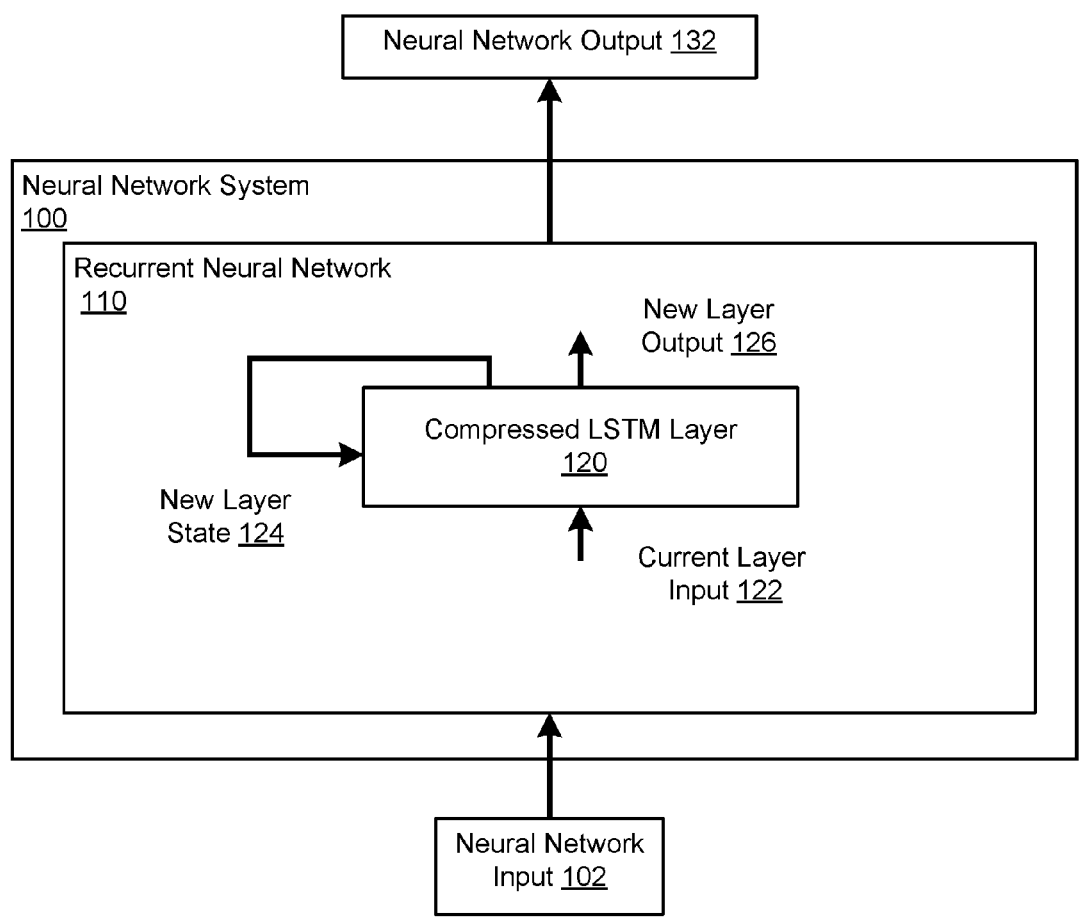
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a machine learning system that receives a respective neural network input at each of multiple time steps and generates a respective neural network output at each of the time steps. That is, at each of the multiple time steps, the neural network system 100 receives a neural network input and processes the neural network input to generate a neural network output. For example, at a given time step, the neural network system 100 can receive a neural network input 102 and generate a neural network output 132.

The neural network system 100 can store the generated neural network outputs in an output data repository or provide the neural network outputs for use for some other immediate purpose.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item. In some of these examples, the neural network system 100 is part of a reinforcement learning system that provides content recommendations to users.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is features of a spoken utterance, the output generated by the neural network system 100 may be a score for each of a set of pieces of text, each score representing an estimated likelihood that the piece of text is the correct transcription for the utterance.

As another example, if the inputs to the neural network system 100 are images, the output generated by the neural network system 100 may be a score for each of a set of pieces of text, each score representing an estimated likelihood that the piece of text is text that is present in the input image.

In particular, the neural network system 100 includes a recurrent neural network 110 which, in turn, includes a compressed Long Short-Term Memory (LSTM) layer 120. The recurrent neural network 110 is configured to, at each of the time steps, receive the neural network input and to process the neural network input to generate the neural network output at the time step.

In addition to the compressed LSTM layer 120, the recurrent neural network 110 may include one or more other components, e.g., other compressed LSTM layers, conventional LSTM layers, other recurrent neural network layers, other non-recurrent neural network layers, and so on.

For example, the recurrent neural network 100 may be a deep LSTM network that includes an input layer, multiple LSTM layers including the compressed LSTM layer 120 arranged in an ordered stack one on top of one another, and an output layer that, at each time step, receives the layer output from the highest LSTM layer in the stack and, optionally, other LSTM layers in the stack, and processes the layer output to generate the neural network output 132 at the time step.

The compressed LSTM layer 120 is configured to, at each of the time steps, receive a current layer input 122 and to process the current layer input 122, a current layer state, and a current layer output to generate a new layer output 126 and to update the current layer state to generate a new layer state 124.

Depending on the configuration of the recurrent neural network 110, the current layer input 122 may be the neural network input 102 or an output generated by a different component of the recurrent neural network 110.

Additionally, for each time step after the first step, the current layer state is the new layer state generated at the preceding time step and the current layer output is the new layer output from the preceding time step. For the first time step, the current layer state may be a predetermined initial layer state and the current layer output may be a predetermined initial layer output.

Depending on the configuration of the recurrent neural network 110, the new layer output 126 may be provided as input to another LSTM layer in the recurrent neural network 110, as input to a different type of neural network component, e.g., to an output layer or a different type of neural network layer, or may be provided as the neural network output 132 of the recurrent neural network 110.

In particular, the compressed LSTM layer 120 applies multiple gates to the current layer input 122, the current layer state, and the current layer output to generate the new layer output 126 and to update the current layer state to generate the new layer state 124, with at least one of the gates including a compressed weight matrix. For example, at least one layer of the layer stack can be compressed by replacing one or more of the gate parameter matrices in the layer with a structured matrix ("structured matrix compression") or by re-defining the gate parameter matrices with a compressed parameter matrix and a projection matrix ("projection compression"). The gates can include, but are not limited to, e.g., an input gate, a forget gate, a cell state gate, or an output gate. In addition, each gate can include both inter-layer and recurrent parameter matrices.

A structured matrix is an m×n matrix that can be described in fewer than mn parameters. FIG. 2A illustrates examples of structured matrices. For example, structured matrices include the following general classes: Toeplitz matrices 200, Vandermonde matrices 202, and Cauchy matrices 204. In particular, a Toeplitz matrix 200 is one in which the parameters are tied along diagonals. That is, Toeplitz matrices 200 have constant values along each of their diagonals. When the same property holds for anti-diagonals, the matrices 200 are called Hankel matrices. A Vandermonde matrix 202 is one in which matrix entries of the third through n-th columns are defined by taking elementwise powers of entries in the second column of the matrix. Similarly, a Cauchy matrix 204 is one that can be completely defined by two vectors (U and V). Each element $a_{ij}$ of the Cauchy matrix 204 is defined by $$\frac{1}{(u_i - v_j)}.$$

The use of such structured matrices to represent gate matrices in compressed LSTM layers can reduce the memory requirements for LSTM networks because they can be fully described by fewer than mn parameters. In addition, structured matrices can accelerate the training and processing of LSTM networks because they allow matrix-vector product and gradient computations to be performed faster.

The above general classes of structured matrices may be modified into a structured-like matrix for use in a compressed LSTM layer 120. For example, Toeplitz-like matrices are generalizations of the Toeplitz structure that include products and inverses of Toeplitz matrices, and their linear combinations. Toeplitz-like matrices can be parameterized as shown in FIG. 2B, as a sum over products of r circulant and skew-circulant matrices.

Referring again to FIG. 1, for convenience, the use of structured matrices in a compressed LSTM layer 120 of a recurrent neural network 110 will be discussed using Toeplitz-like matrices as an example. The complexity of Toeplitz-like matrices can be controlled using the displacement rank, i.e., the number of products that are being summed together as shown in sum of the circulant and skew-circulant matrices FIG. 2B. Low displacement rank corresponds to highly structured matrices such as circulant and Toeplitz matrices and their inverses. High displacement rank matrices can be used to model increasingly unstructured matrices. in some examples, the displacement rank can be used to control the computational complexity, storage requirements, and modeling capacity of for a compression scheme. In some examples, the displacement rank can be tuned based on application requirements.

In some implementations, the Toeplitz-like matrix structure is applied to recurrent and inter-layer parameter matrices for all of the gates in a particular compressed LSTM layer 120. In some implementations, the Toeplitz-like matrix structure is applied to lower ordered layer(s) in a layer stack (e.g., layers 1 and 2).

In a projection compression model for a recurrent neural network layer, a compressed LSTM layer 120 is produced by replacing uncompressed recurrent parameter matrix, of size m×n, from a particular layer (e.g., layer l) with a compressed recurrent parameter matrix, of size m×r, and a projection matrix r×n. In addition, a corresponding inter-layer parameter matrix, also of size m×n, from a next higher order LSTM layer (e.g., layer l+1) is replaced by a compressed inter-layer matrix, of size m×r, and the same projection matrix. Furthermore, the respective ranks of the compressed recurrent and inter-layer matrices and the projection matrix are less than the ranks of the corresponding recurrent and inter-layer parameter matrices. The low-rank projection matrix is shared across the two corresponding layers. The projection compression model can be applied to one or more different gates. In some implementations, the projection compression model is applied to higher ordered layer(s) in a layer stack (e.g., layers 2-N).

In some implementations, a layer or set of layers can be compressed by the use of structured matrices (or structured-like matrices) and a layer or set of layers can be compressed using projection matrices. For example, a lower ordered layer or set of layers (e.g., layers 1 and 2) of an recurrent neural network 110 can be compressed by replacing gate parameter matrices with Toeplitz-like matrices and a higher ordered layer or set of layers (e.g., layers 2-N) can be compressed using projection matrices.

In some implementations, the above described compression techniques may result in at least a 75% reduction in parameters for an LSTM neural network. In some implementations, where the system is a speech recognition model, the above described compression techniques may result in at least a 75% compression of the LSTM neural network while retaining a word error rate that is within 0.3% of a word error rate (WER) of an uncompressed version of the system. In some examples, the above described compression techniques may result a compression of an LSTM neural network that ranges from 75% -83% with a corresponding WER from 0.3% -2.3%.

In order to configure the recurrent neural network 110 to generate neural network outputs, the neural network system 100 trains the recurrent neural network 110 to determine trained values of the parameters of the recurrent neural network 110, including determining trained values of the parameters of the saturating LSTM layer 120. Training the recurrent neural network is described in more detail below with reference to FIG. 5.

Figure 3:
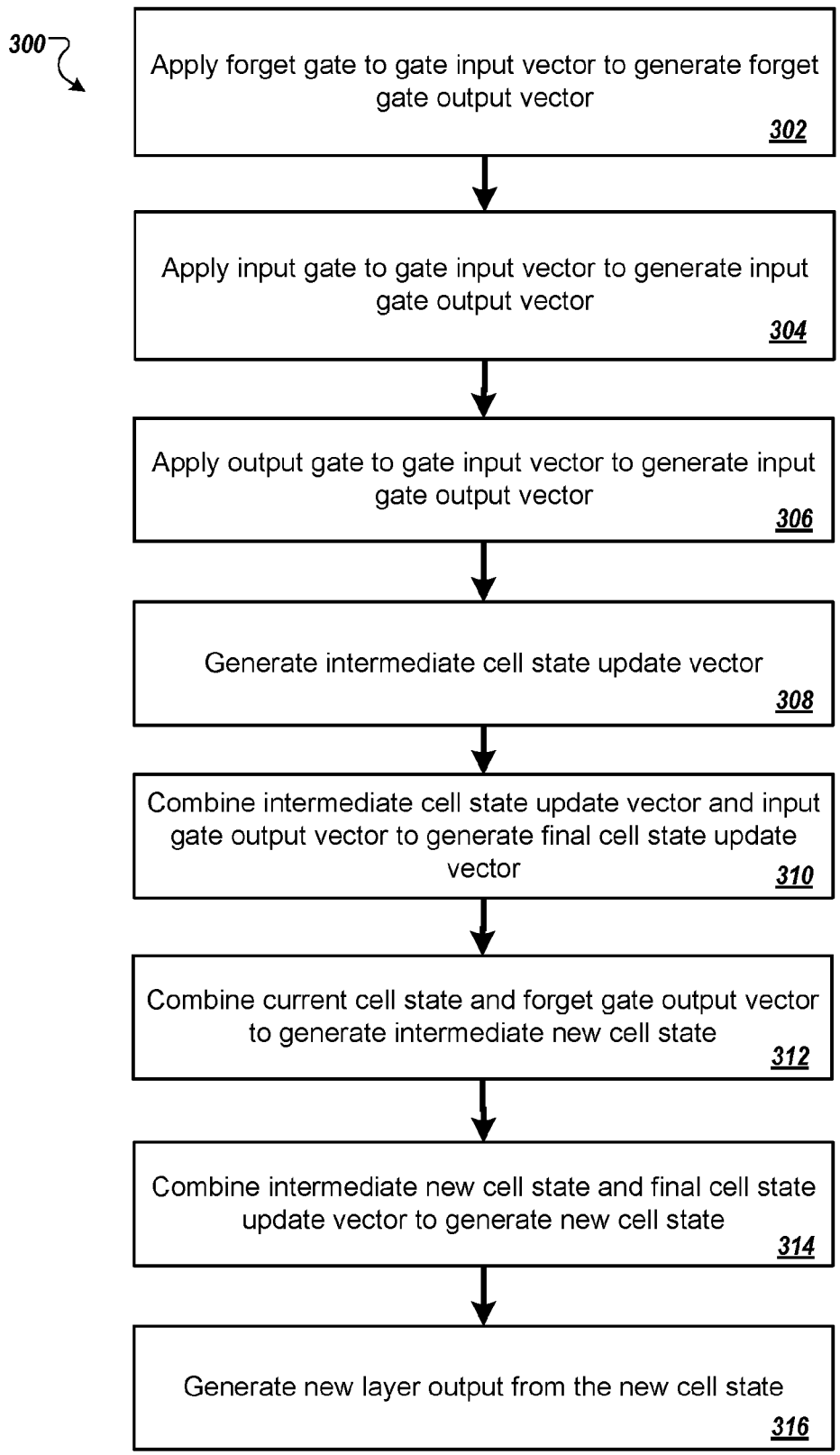
FIG. 3 is a flow diagram of an example process for processing a current layer input to generate a next layer output.

FIG. 3 is a flow diagram of an example process 300 for processing a current layer input to generate a next layer output. For convenience, the process 300 will be described as being performed by a saturating LSTM layer implemented by a system of one or more computers located in one or more locations. For example, a saturating LSTM layer in a neural network system, e.g., the compressed LSTM layer 120 of the neural network system 100 of FIG. 1, appropriately programmed in accordance with this specification, can perform the process 300.

The LSTM layer applies a forget gate to a gate input vector to generate a forget gate output vector (step 302). Applying a gate to a gate input vector will be described in more detail below with reference to FIG. 4.

In some implementations, the LSTM layer generates the gate input vector by concatenating the current layer input and the current layer output. In some other implementations, the LSTM layer is a peephole LSTM layer that generates the gate input vector by concatenating the current layer input, the current layer output, and the current layer state.

The LSTM layer applies an input gate to the gate input vector to generate an input gate output vector (step 304). Applying a gate to a gate input vector will be described in more detail below with reference to FIG. 4. In some implementations, the input gate includes a structured parameter matrix, e.g., a Toeplitz-like structured parameter matrix. In some implementations, the input gate includes a compressed recurrent or inter-layer matrix and a corresponding projection matrix.

In some implementations, instead of applying the input gate to generate the input gate output vector, the system uses the forget gate output vector as the input gate output vector. That is, in some implementations, the input gate is the same as the forget gate.

The LSTM layer applies an output gate to the gate input vector to generate an output gate output vector (step 306). Applying a gate to a gate input vector will be described in more detail below with reference to FIG. 4. In some implementations, the output gate includes a structured parameter matrix, e.g., a Toeplitz-like structured parameter matrix. In some implementations, the output gate includes a compressed recurrent or inter-layer matrix and a corresponding projection matrix.

The LSTM layer generates an intermediate cell state update vector from the current layer input and the current layer output (step 308). In particular, the LSTM layer processes the current layer input and the current layer output using a neural network layer having an activation function that is a squashing function to generate the intermediate cell state update vector.

Generally, a squashing function is a function that maps received inputs to a range of −1 to 1, exclusive. For example, the squashing function may be the hyperbolic tangent function.

The LSTM layer combines the intermediate cell state update vector and the input gate output vector to generate a final cell state update vector (step 310). In particular, the LSTM layer computes a point-wise multiplication between the intermediate cell state update vector and the input gate output vector to generate the final cell state update vector.

The LSTM layer combines the current cell state and the forget gate output vector to generate an intermediate new cell state (step 312). In particular, the LSTM layer computes a point-wise multiplication between the current cell state and the forget output vector to generate the intermediate new cell state. In some implementations, the forget gate includes a structured parameter matrix, e.g., a Toeplitz-like structured parameter matrix. In some implementations, the forget gate includes a compressed recurrent or inter-layer matrix and a corresponding projection matrix.

The LSTM layer combines, e.g., sums, the intermediate new cell state and the final cell state update vector to generate a final new cell state (step 314).

The LSTM layer generates a new layer output from the final new cell state (step 316). To generate the new layer output, the LSTM layer applies a squashing function to each component of the final new cell state to generate an intermediate new layer output.

The LSTM layer then combines the output gate output vector and the intermediate new layer output to generate the new layer output. In particular, the LSTM layer performs a pointwise multiplication between the output gate output vector and the intermediate new layer output to generate the new layer output.

In addition to using the final new layer state in generating the new layer output, the LSTM layer maintains the final new cell state along with the new layer output for use at a subsequent time step.

Figure 4:
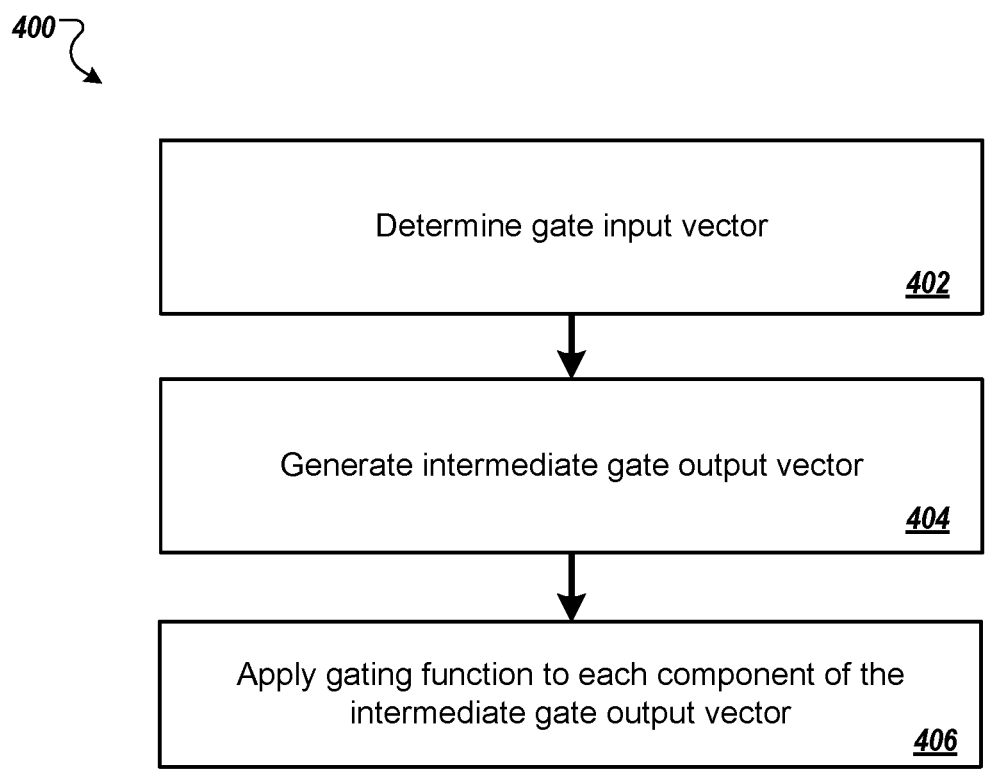
FIG. 4 is a flow diagram of an example process for applying a gate to a gate input vector to generate a gate output vector.

FIG. 4 is a flow diagram of an example process 400 for applying a gate to a gate input vector to generate a gate output vector. For convenience, the process 400 will be described as being performed by a saturating LSTM layer implemented by a system of one or more computers located in one or more locations. For example, a compressed LSTM layer in a neural network system, e.g., the LSTM layer 120 of the neural network system 100 of FIG. 1, appropriately programmed in accordance with this specification, can perform the process 400.

The LSTM layer determines the gate input vector (step 402).

The LSTM layer generates a respective intermediate gate output vector from the gate input vector in accordance with a set of parameters (step 404). In some implementations, the LSTM layer performs a matrix multiplication between a parameter matrix and the gate input vector and then adds a bias vector to the output of the matrix multiplication to generate the intermediate gate output vector, with each of the gates having different parameter matrices and bias vectors. That is, in implementations where the LSTM layer has a distinct input gate, forget gate, and output gate, each of these gates will have different parameter matrices and bias vectors from each other gate.

The LSTM layer applies a gating function to each component of the respective intermediate gate output vector to generate a final gate output vector (step 406).

Generally, a gating function is a function that maps received inputs to a range of 0 to 1, exclusive. For example, a gating function may be the sigmoid function.

For at least one of the gates of the LSTM layer, however, the parameter matrix referenced in step 404 is a compressed parameter matrix. An uncompressed parameter matrix is replaced with a compressed parameter matrix. The LSTM layer then performs a matrix multiplication between the compressed parameter matrix and the gate input vector. For example, the compressed matrix can replace a parameter matrix in any of an input gate, a forget gate, a cell state, or an output gate. In some implementations, compressed parameter matrices are applied to multiple gates in an LSTM layer. For example, compressed parameter matrices can be applied to both an input and an output gate. As another example, compressed parameter matrices can be applied to an input, an output gate, and a forget gate.

In some implementations, the compressed parameter matrix is a structured-like matrix, e.g., a Toeplitz-like structured matrix. In some implementations, an uncompressed gate parameter is re-defined with a compressed parameter matrix and a corresponding projection matrix.

Figure 5:
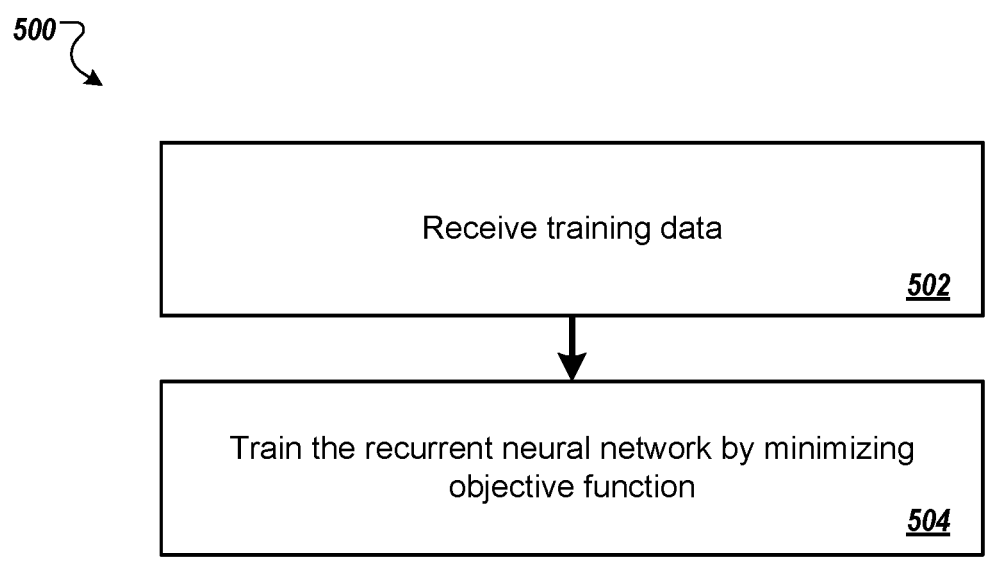
FIG. 5 is a flow diagram of an example process for training a recurrent neural network that includes a saturating LSTM layer.

FIG. 5 is a flow diagram of an example process 500 for training a recurrent neural network that includes a compressed LSTM layer. For convenience, the process 500 will be described as being performed by a system of one or more computers located in one or more locations. For example, a neural network system, e.g., the neural network system 100 of FIG. 1, appropriately programmed in accordance with this specification, can perform the process 500.

The system obtains training data for training the recurrent neural network (step 502). The training data includes multiple training example pairs, with each training example pair including a training neural network input and a target neural network output for the training neural network input.

The system trains the recurrent neural network on the training data to determine trained values of the parameters of the recurrent neural network from initial values of the parameters by optimizing, i.e., either maximizing or minimizing, an objective function (step 504). During the training the system imposes constraints on the values of the compressed matrix or matrices so that they continue to satisfy the requirements for the compressed matrix. For example, for Teoplitz-like structured matrices the system can impose constraints so that the entries of each compressed matrix are always Teoplitz-like or, for the projection model compressed matrices, the system can adjust the values of the projection matrix and the compressed parameter matrix rather than adjusting the values of the parameter matrix directly.

The system trains the recurrent neural network by optimizing the objective function using a conventional machine learning training technique, e.g., a stochastic gradient descent with backpropagation through time training technique. That is, the system can perform multiple iterations of the training technique to optimize the objective function by adjusting the values of the parameters of the recurrent neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for receiving a system input comprising a respective neural network input at each of a plurality of time steps and providing, in response to the received system input, a system output comprising a respective neural network output at each of the plurality of time steps, the system comprising:
   a recurrent neural network implemented by one or more computers, wherein the recurrent neural network is configured to receive the respective neural network input at each of the plurality of time steps and to generate the respective neural network output at each of the plurality of time steps, and wherein the recurrent neural network comprises:
      a first long short-term memory (LSTM) layer, wherein the first LSTM layer is configured to, for each of the plurality of time steps, generate a new layer state and a new layer output by applying a plurality of gates to a current layer input, a current layer state, and a current layer output, each of the plurality of gates being configured to, for each of the plurality of time steps, generate a respective intermediate gate output vector by multiplying a gate input vector and a gate parameter matrix, and
      wherein the gate parameter matrix for at least one of the plurality of gates is a Toeplitz-like structured matrix.

2. The system of claim 1, wherein the recurrent neural network comprises a second LSTM layer, wherein the second LSTM layer is configured to, for each of the plurality of time steps, generate a second new layer state and a second new layer output by applying a second plurality of gates to a second current layer input, a second current layer state, and a second current layer output, each of the second plurality of gates being configured to, for each of the plurality of time steps, generate a respective second intermediate gate output vector by multiplying a second gate input vector and a second gate parameter matrix, and
   wherein the gate parameter matrix for at least one of the second plurality of gates is defined by a compressed parameter matrix and a projection matrix.

3. The system of claim 2, wherein the first LSTM layer and the second LSTM layer are each one of a plurality of LSTM layers in an ordered stack of layers.

4. The system of claim 3, wherein the first LSTM layer is lower in the stack than the second LSTM layer.

5. The system of claim 1, wherein each of the plurality of gates are configured to, for each of the plurality of time steps, apply a respective gating function to each component of the respective intermediate gate output vector to generate a respective final gate output vector.

6. The system of claim 1, wherein the neural network is an acoustic model.

7. The system of claim 1, wherein the neural network is a speech recognition model.

8. The system of claim 1, wherein the neural network is compressed by at least 75% of an uncompressed version of the neural network.

9. The system of claim 1, wherein a word error rate of the neural network is within 0.3% of a word error rate of an uncompressed version of the neural network.

10. A system for receiving a system input comprising a respective neural network input at each of a plurality of time steps and providing, in response to the received system input, a system output comprising a respective neural network output at each of the plurality of time steps, the system comprising:
    a recurrent neural network implemented by one or more computers, wherein the recurrent neural network is configured to receive the respective neural network input at each of the plurality of time steps and to generate the respective neural network output at each of the plurality of time steps, and wherein the recurrent neural network comprises:
       a first long short-term memory (LSTM) layer, wherein the first LSTM layer is configured to, for each of the plurality of time steps, generate a new layer state and a new layer output by applying a plurality of gates to a current layer input, a current layer state, and a current layer output, each of the plurality of gates being configured to, for each of the plurality of time steps, generate a respective intermediate gate output vector by multiplying a gate input vector and a gate parameter matrix, and
    wherein the gate parameter matrix for at least one of the plurality of gates is defined by a compressed parameter matrix and a projection matrix.

11. The system of claim 10, wherein the recurrent neural network comprises a second LSTM layer, wherein the second LSTM layer is configured to, for each of the plurality of time steps, generate a second new layer state and a second new layer output by applying a second plurality of gates to a second current layer input, a second current layer state, and a second current layer output, each of the second plurality of gates being configured to, for each of the plurality of time steps, generate a respective second intermediate gate output vector by multiplying a second gate input vector and a second gate parameter matrix, and
    wherein the gate parameter matrix for at least one of the second plurality of gates is a Toeplitz-like structured matrix.

12. The system of claim 11, wherein the first LSTM layer and the second LSTM layer are each one of a plurality of LSTM layers in an ordered stack of layers.

13. The system of claim 12, wherein the second LSTM layer is lower in the stack than the first LSTM layer.

14. The system of claim 10, wherein each of the plurality of gates are configured to, for each of the plurality of time steps, apply a respective gating function to each component of the respective intermediate gate output vector to generate a respective final gate output vector.

15. The system of claim 10, wherein the neural network is an acoustic model.

16. The system of claim 10, wherein the neural network is a speech recognition model.

17. The system of claim 10, wherein the neural network is compressed by at least 75% of an uncompressed version of the neural network.

18. The system of claim 10, wherein a word error rate of the neural network is within 0.3% of a word error rate of an uncompressed version of the neural network.

19. One or more non-transitory computer storage media encoded with a computer program product, the computer program product comprising instructions that when executed by one or more computers cause the one or more computers to implement a system for receiving a system input comprising a respective neural network input at each of a plurality of time steps and providing, in response to the received system input, a system output comprising a respective neural network output at each of the plurality of time steps, the system comprising:

a recurrent neural network, wherein the recurrent neural network is configured to receive the respective neural network input at each of the plurality of time steps and to generate the respective neural network output at each of the plurality of time steps, and wherein the recurrent neural network comprises:

a first long short-term memory (LSTM) layer, wherein the first LSTM layer is configured to, for each of the plurality of time steps, generate a new layer state and a new layer output by applying a plurality of gates to a current layer input, a current layer state, and a current layer output, each of the plurality of gates being configured to, for each of the plurality of time steps, generate a respective intermediate gate output vector by multiplying a gate input vector and a gate parameter matrix, and wherein the gate parameter matrix for at least one of the plurality of gates is a Toeplitz-like structured matrix.

20. One or more non-transitory computer storage media encoded with a computer program product, the computer program product comprising instructions that when executed by one or more computers cause the one or more computers to implement a system for receiving a system input comprising a respective neural network input at each of a plurality of time steps and providing, in response to the received system input, a system output comprising a respective neural network output at each of the plurality of time steps, the system comprising:

a recurrent neural network, wherein the recurrent neural network is configured to receive the respective neural network input at each of the plurality of time steps and to generate the respective neural network output at each of the plurality of time steps, and wherein the recurrent neural network comprises:

a first long short-term memory (LSTM) layer, wherein the first LSTM layer is configured to, for each of the plurality of time steps, generate a new layer state and a new layer output by applying a plurality of gates to a current layer input, a current layer state, and a current layer output, each of the plurality of gates being configured to, for each of the plurality of time steps, generate a respective intermediate gate output vector by multiplying a gate input vector and a gate parameter matrix, and wherein the gate parameter matrix for at least one of the plurality of gates is defined by a compressed parameter matrix and a projection matrix.

\* \* \* \* \*